Dec. 23, 1930.                J. B. OLSON ET AL                    1,785,785
                                FEEDING APPARATUS
                              Filed Dec. 16, 1926

INVENTOR.
John B. Olson
George T. Markey
BY
Erwin, Wheeler & Woolard
ATTORNEY.

Patented Dec. 23, 1930

1,785,785

UNITED STATES PATENT OFFICE

JOHN B. OLSON AND GEORGE T. MARKEY, OF FORT ATKINSON, WISCONSIN, ASSIGNORS TO JAMES MANUFACTURING COMPANY, OF FORT ATKINSON, WISCONSIN

FEEDING APPARATUS

Application filed December 16, 1926. Serial No. 155,134.

This invention relates to improvements in feeding apparatus of that type usually classed as poultry feeders in which the weight of the bird in feeding position on a perch or shelf is utilized to cause an agitation of the material and a delivery of a portion thereof from a storage chamber into a feeding pan or trough. In a companion application Serial No. 152,088, filed December 2nd, 1926, for Letters Patent for improvements in feeders, we have shown and described a structure in which a feed pan is mounted in unstable equilibrium underneath an open mouthed hopper or storage chamber, thereby the weight of an animal or bird placing itself in feeding position may be relied upon to tilt the pan and cause delivery of a portion of the food from the storage receptacle into the pan. The structure shown in that application is peculiarly adapted for small feeders, particularly circular feeders so arranged that the pan may be tilted in any lateral direction.

The object of this invention is to provide feeding apparatus which may be operated on the same general principle, but which will be adapted for feeders of larger sizes and particularly for elongated feeders intended to accommodate a considerable number of animals or birds simultaneously. More particularly stated, the objects of the present invention are to provide means for utilizing the weight of the feeding animal or bird to tilt a feeding pan in one or two directions underneath an open bottomed storage chamber or receptacle; to provide means for effectively working the material toward the sides of the pan from the longitudinal center line whenever the pan is so tilted; to provide cooperative agitating means adapted to be actuated by the pan when tilted to relieve clogged material from the receptacle outlet; and in general, to provide a compact, durable and efficient feeder in which the major portion of the feed will be protected from damage and small quantities progressively exposed for feeding purposes by the action of the animals or birds when placing themselves in feed position.

In the drawings.

Like parts are identified by the same reference characters throughout the several views.

Figure 1:
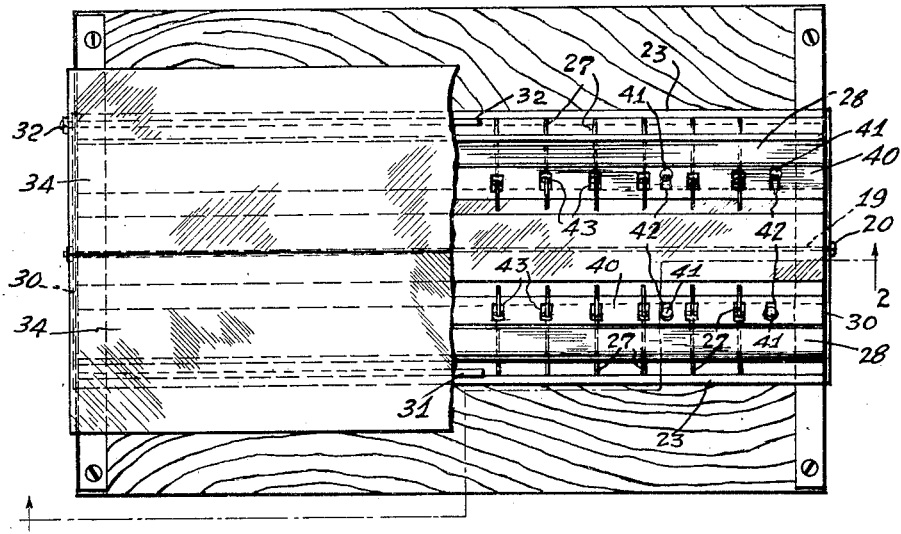
Figure 1 is a plan view of a feeder embodying our invention with portions broken away to show the lower portion of the hopper or storage chamber in plan and to also expose a central portion of the feeding pan.
Figure 2:
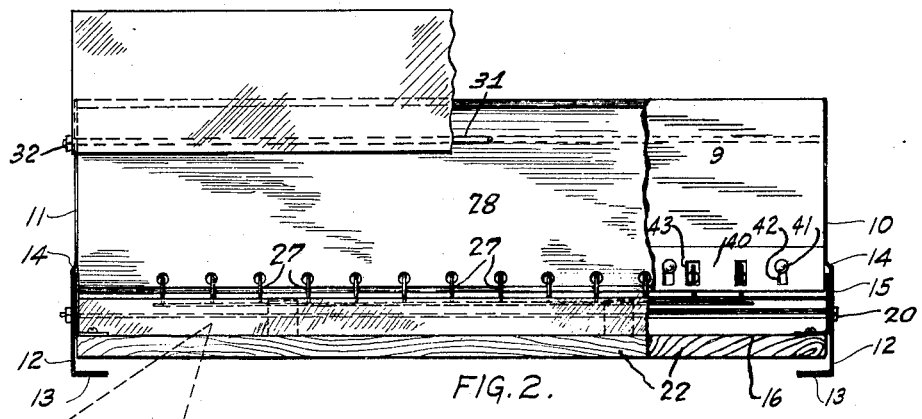
Figure 2 is a front elevation with a portion of the roof broken away and a portion also shown in vertical section drawn generally on line 2—2 of Figure 1.

Our improved feeding apparatus when constructed as shown in the drawings has a storage chamber 9 supported by a pair of end walls 10 and 11 which are formed of sheet metal and have downwardly extending portions 12 provided with inturned flanges 13 which serve as foot pieces. The portions 12 are outwardly offset at 14 to provide clearance for the end walls 15 of a rectangular feeding pan having a bottom 16 and side walls 17. The bottom 16 of this feeding pan has a longitudinally extending central portion upwardly offset to form a broad hollow rib 18 through which a pivot bolt 19 extends. The end portions of this bolt pass through holes in the end walls 15 of the pan and through corresponding holes in the portions 12 of the end walls 10 and 11 of the storage chamber. One end of the bolt may be headed and the other provided with nut 20 to prevent it from slipping out.

The end walls of the storage chamber 9 and also those of the feeding pan are thus connected, and the pan supported by this bolt 19 along a line above the foot pieces 13 and the pan is free to tilt upon the bolt 19. The end walls 15 of the pan have extensions 21 which support perches or platforms 22 upon which the feet of the animals or birds may rest when they place themselves in feeding position.

Figure 3:
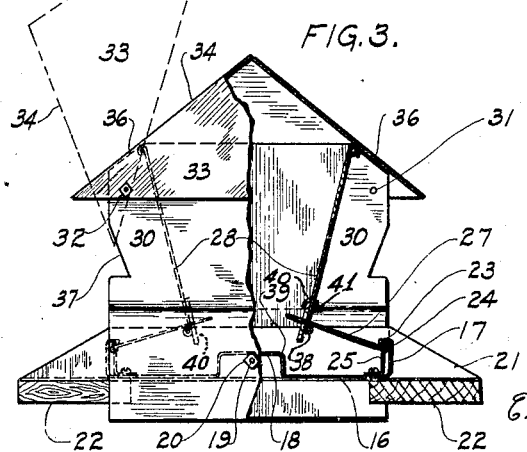
Figure 3 is an end elevation partially in vertical section drawn to a transverse plane.

The upper margins of the side wall 17 are inturned to form flanges 23, and longitudinally extending rods 24 are supported by brackets 25 underneath these flanges. Each of the rods 24 is provided at intervals with spaced fingers 27 which extend through suitable apertures in the side walls 28 of the storage chamber as clearly shown in Figure 3. When the feeding pan is tilted upon its supporting pivot bolt 19, the fingers 27 will be retracted on the downwardly moving side and will extend farther into the storage chamber from the upwardly moving side. The fingers are of sufficient length so that they will retain their engagement in the storage chamber apertures in all positions of pan adjustment.

The fingers 27 perform three functions. They provide feeding spaces through which the heads of the feeding animals or the birds may pass to obtain access to the food within the pan; they prevent the food from being thrown laterally by the bills or noses of the feeding birds or animals as freely as would otherwise be the case; and they also serve as agitators to prevent clogging of material in the storage chamber, the walls 28 of which preferably converge downwardly.

The end walls 10 and 11 of the storage chamber preferably extend laterally to form end guards 30 and these guards are preferably connected by bolts at 31 and 32. The bolt 32 may extend through the gable or end walls 33 of a roof 34, whereby the roof may be tilted to the position indicated by dotted lines in Figure 3 to afford access to the storage chamber. The end guards 30 are provided with oblique upper margins 36 upon which the roof may rest when in normal position. When in the open position, a portion of the roof may engage an oblique margin 37 on the associated end guards 30, said oblique marginal portion 37 serving as a stop to support the roof in its open position.

The operation of the feeder will be readily understood. The pivot rod 19 is slightly above the bottom 16 of the pan, but is near enough to the bottom so that the pan will be supported in unstable equilibrium and a slight increase in weight on either of the perches 22 will be sufficient to tilt the pan. When the pan is so tilted, the opening between the lower margin 38 of the hopper or storage chamber side wall and the associated corner 39 of the rib 18 will be enlarged on the downwardly moving side by depression of the ribbed corner or shoulder 39 and it will be correspondingly enlarged on the upwardly moving side by the arcuate movement of the shoulder 39 on that side toward the longitudinal center line or plane of the apparatus. On the downwardly moving side, the rib will tend to push outwardly material previously delivered in the pan and its movement will be facilitated by gravity. On the other side, material descending from the hopper will accumulate in a position to be pushed laterally when the tilting movement occurs in the opposite direction.

Attempts have heretofore been made to provide tilting self-feeding pans with supporting agitating members extending upwardly into or through the contents of the hopper but it will be obvious that in a poultry feeder, such a construction is impractical for the reason that the fowls will not have sufficient weight to tilt the feeding pan when the movement is resisted by the pressure of material in a full or nearly full hopper; such features are also objectionable for any purpose because agitating members or pan supporting rods extended upwardly into a hopper will agitate the material but slightly when the hopper is nearly full and will cause a complete discharge of the contents when the hopper is less than half full or between that time and the time when it is only one-quarter full. In a poultry feeder, such a large downward discharge of material will also clog the space between the bottom of the hopper and the bottom of the pan so as to prevent tilting movements of the latter; whereas, in our improved construction the fingers 27 move axially with a very short stroke and with slight agitation. Their movement requires but little power and they tend to support the material within the hopper in a manner to prevent any violent discharge of a large quantity of material into the pan at any one time.

If desired, adjustable feed controlling wings or slides 40 may be mounted on the inner surfaces of the side walls 28 of the hopper and secured thereto by clamping bolts 41 which pass through slots 42 in the wings. The wings are also provided with slots 43 through which the fingers 27 extend. By loosening the clamping bolts, the wings may be adjusted to increase or diminish the feeding area or space between the lower margins 38 of the hopper side walls and the associated rib corner 39.

The foot rests or perches 22 will preferably be employed when the feeder is used for feeding poultry. When employed for feeding pigs, rabbits, or other animals, these perches or foot rests may be omitted. The animals will press their noses against the bottom of the pan and tilt it even more readily and frequently if the foot rests are omitted, than would otherwise be the case. But with some animals, foot rests will be desirable to prevent too frequent and rapid agitation and consequent excessive deliveries from the storage chamber into the pan.

We claim:

1. A feeding apparatus comprising a storage chamber having a bottom outlet and supporting end walls, and a feeding pan underneath the outlet of the storage chamber and tiltingly supported by said end walls in feed controlling relation to said outlet, said feeding pan being provided with an upwardly extending rib having a flat table-like surface along the longitudinal center line of its bottom portion and in a supporting relation to the major portion of material tending to drop to the pan from the hopper and also having feeding fingers extending from the side walls of the pan through apertures in the storage chamber adjacent to its outlet, whereby material in the storage chamber is caused to pass through the outlet when the pan is tilted and is pushed laterally by said rib.

2. A poultry feeding apparatus comprising the combination of a set of supporting end walls and a set of downwardly convergent side walls terminating at a substantial distance above the lower margins of the end walls and forming an open bottom hopper for the storage of food material, a feeding pan having its ends pivotally supported from said end walls adjacent to the bottom of the pan, the bottom of the pan being upset along its longitudinal central line to form a table-like platform above said pivotal axis upon which food material from the central portion of the hopper may be received, said pan being wider than the open bottom of the hopper whereby food material may slide laterally to positions where it can be reached from points exterior to the hopper, and poultry support roosts along the sides of the pan, supported therefrom and adapted in cooperation with the walls of the pan to serve as levers to tilt the pan under the weight of fowls in feeding position.

3. A poultry feeding apparatus comprising a storage chamber having convergent side walls and being open at its bottom, a feeding pan having its ends pivotally supported adjacent its bottom and beneath the opening in the chamber, said pan having the central portion of its bottom upset to form a flat shelf directly underneath the central portion of the opening in the chamber and said pivotal axis being underneath said shelf whereby the pan may be tilted in either direction by slight downward pressure applied to one side thereof, regardless of the quantity of material in the chamber.

GEORGE T. MARKEY.
JOHN B. OLSON.